Oct. 12, 1965 WOO F. CHOW 3,211,925

LOGIC CIRCUIT UTILIZING STORAGE DIODES
AND NEGATIVE RESISTANCE DIODE

Filed Feb. 11, 1963

INVENTOR
WOO F. CHOW

BY J. Donald Weber, Jr.

AGENT

3,211,925
LOGIC CIRCUIT UTILIZING STORAGE DIODES AND NEGATIVE RESISTANCE DIODE

Woo F. Chow, Horsham Township, Pa., assignor to Sperry Rand Corporation, New York, N.Y., a corporation of Delaware Filed Feb. 11, 1963, Ser. No. 257,630
5 Claims. (Cl. 307—88.5)

This invention relates to an improved logic circuit. In particular, the circuit utilizes a tunnel diode as the active element and performs the NOR logic function.

It is well known that the present state of technology requires high-speed data processing machines to perform many assorted functions. These machines may be utilized as business machines, such as are used in accounting offices or the like. On the other hand, similar types of machines may be utilized as mathematical computing devices. Regardless of the type of use which is contemplated for the machine, it is desirable to have extremely high speeds of operation especially in view of the magnitude of certain tasks to be performed.

In order for the machines to operate more rapidly, improvements in the state of the art have been developed. One of the components which has been developed is a tunnel diode, which is discussed in much current literature. It is well known in the art that the tunnel diode exhibits two stable states of operation, as well as extremely rapid switching from one state to the other. Therefore, the tunnel diode readily lends itself to utilization in high speed computing devices. Therefore, circuits have been developed which utilize the advantageous operating characteristics of tunnel diodes.

In order that the tunnel diode and tunnel diode circuitry may be useful in high speed operating equipment, logic circuits are necessary. A very important logic circuit (a circuit which utilizes a powerful logic function) is a NOR logic circuit. NOR logic circuits have been disclosed in the past, as for example in the copending patent application of Brian Elliott Sear entitled Logic Circuit which was filed on February 21, 1962 and has the Serial Number 174,829. The instant circuit improves upon the operation of the NOR circuits described in the above-mentioned copending application which is assigned to the common assignee of the instant invention. That is, a tunnel diode is connected to a biasing source such that the tunnel diode operates in the bistable mode. A switch or clock signal is selectively applied to the tunnel diode via a unilaterally conducting device under conditions which are controlled by an input coupling device. The input coupling device is a selectively bilateral conducting device. In a preferred embodiment, this input coupling device is a diode which exhibits stored charge characteristics. Thus, in accordance with whether or not charge has been stored in the input coupling diode, a clock signal may or may not be applied to the tunnel diode via the unilaterally conducting device. If in fact the tunnel diode is switched from one state to another, means are provided for resetting the tunnel diode to a preferred operating state.

Thus, it will be seen that one object of this invention is to provide a logic circuit using tunnel diodes.

Another object of this invention is to provide a logic circuit having high speed operation.

Another object of this invention is to provide a high speed logic circuit using tunnel diodes and having large fan-in and fan-out characteristics.

Another object of this invention is to provide a high speed logic circuit which performs the NOR logic function.

Another object of this invention is to provide a logic circuit wherein the tolerance requirements on the coupling diodes is reduced.

Another object of this invention is to provide a high speed logic circuit using tunnel dodes, wheren wide tolerances on the various components and parameters are obtainable.

These and other objects and advantages of this invention will become more readily apparent when the following description is read in conjunction with the drawings attached hereto, in which.

Figure 1:
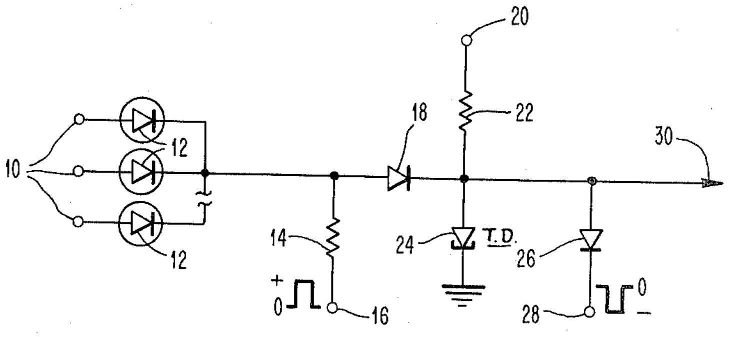
FIGURE 1 is a schematic diagram of one embodiment of the invention.

Referring now to FIGURE 1, there is shown a schematic diagram of one embodiment of the NOR logic circuit which is the subject of this invention. The input terminals 10 may represent any conventional type of input source which is capable of supplying compatible signals to the circuit. It is contemplated that input source 10 may include a tunnel diode circuit similar to that shown in FIGURE 1. It is suggested that the compatible signals which are applied to the circuit by input source 10 will have two levels or magnitudes with the low level signal being on the order of +50 millivolts and the high level signal being on the order of +450 millivolts. The suggested signal levels are illustrative only and not conclusive. In addition, the number of input sources 10 is not meant to be limited to three (as shown) but rather may be any number desired. The input sources 10 are connected to the anodes of input coupling diodes 12. These input coupling diodes 12 each have the cathode thereof connected to a common junction which is connected to one terminal of resistor 14. The input coupling diodes 12 are preferably germanium diodes, as for example National XR25 type diodes. These diodes are chosen because they exhibit a desirable reverse voltage-recovering characteristic in response to a forward current therethrough. Resistor 14, which may be about 50 ohms, has one terminal thereof connected to the cathodes of diodes 12 (as noted supra) and another terminal thereof connected to source 16. Source 16 may be any conventional type source which is capable of selectively supplying a pulse type signal. The signals supplied by source 16 should preferably be positive going signals having a peak magnitude of about +2 volts with respect to ground. In the preferred embodiment, this so-called clock signal will have a relatively short duration; in other words, the pulse will be relatively narrow. The width of the pulse is determined by the magnitude of the charge $Q_s$, stored in the input coupling diodes 12. That is, the charge represented by the input signal may be generally characterized as:

$$Q=tI$$

where, Q represents the charge represented by the pulse, $t$ represents the time duration of the pulse and I represents the current produced by the pulse. As will become evident subsequently, it is undesirable for the amount of charge Q delivered by the clock pulse to exceed (at least by a substantial amount) the magnitude of the charge $Q_s$.

The cathodes of input diodes 12 and one terminal of resistor 14 are connected to the anode of coupling diode 18 at a common junction. Coupling diode 18 is preferably a silicon rectifying diode, as for example a Fairchild FD7 type of diode. The silicon coupling diode has a higher "break-point," see FIGURE 2, than the germanium input diode and is characterized by little or no charge-storing capabilities and high speed switching. The cathode of diode 18 is connected to the anode of tunnel diode 24. Tunnel diode 24 may be an RCA 1N3859 type tunnel diode having a peak current characteristic on the order of about 20 milliamperes. This type of tunnel diode is not meant to limit the circuit operation in any way, but rather, is used to describe a preferred circuit embodiment. The cathode of the tunnel diode is connected to a potential source, as for example ground. The anode of tunnel diode 24 is also connected to potential source 20 via resistor 22. Source 20, which may be any conventional type of substantially constant potential source, is adapted to provide a potential of approximately +12 volts with respect to ground. Source 20 and resistor 22, which is on the order of about 800 ohms, comprise a substantially constant current source which is capable of supplying about 15 milliamperes. This current supplied by the constant current source is sufficient to bias tunnel diode 24 near to but below the peak point of its V–I characteristic curve. In addition, the loadline applied to the characteristic is such that the tunnel diode 24 operates in the bistable mode. The anode of reset diode 26 is also connected to the anode of tunnel diode 24. The cathode of reset diode 26 is connected to source 28. Diode 26 may be any type of rectifying diode, as for example germanium or silicon. A typical example is an HD5000 type diode. Source 28 may be any conventional source, similar to source 16, which is capable of selectively supplying a pulse type signal having a magnitude on the order of about —2 volts with respect to ground. Finally, connected to the anode of tunnel diode 24 is the output terminal 30. Output terminal 30 may be considered as being connected to any type of output device, including an input terminal similar to input source 10.

Figure 2:
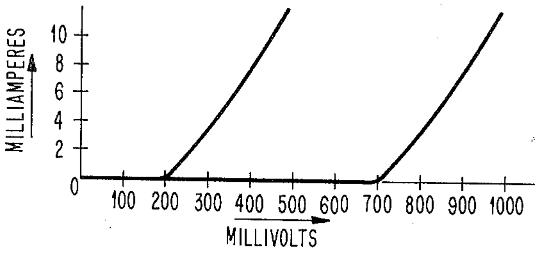
FIGURE 2 shows idealized V–I characteristic curves for the coupling diodes shown in the circuit in FIGURE 1.

Before proceeding with the detailed operation of the circuit shown in FIGURE 1, a discussion of FIGURE 2 is believed pertinent. FIGURE 2 is a graphical representation of the V–I characteristic for the germanium and silicon diodes noted with respect to FIGURE 1. It will be seen that the germanium diode has a break-point or "knee" in the curve at a much lower potential than is the case in the silicon diode. Thus, for example, when a forward biased potential difference on the order of 250 millivolts appears across the germanium diodes, these diodes abruptly (in an idealized condition) change from an open-circuit to a near short-circuit device. However, with the application of a 250 millivolt potential across the silicon diode, this latter diode remains an open-circuit device. The silicon diode will not switch to the short-circuit condition until a forward biased potential difference on the order of about 700 millivolts is applied thereacross. The reasons for the utilization of diodes having such different operating conditions will become apparent subsequently.

Referring again to FIGURE 1, the operation of the circuit will be assumed, for convenience, to be initiated by a reset pulse applied by source 28. This pulse will be defined for the present as being sufficient to cause tunnel diode 24 to reside in the low voltage operating condition. If now, it is assumed that the input signals supplied by sources 10 to the anodes of all of the input coupling diodes 12 are low level signals on the order of about +50 millivolts with respect to ground it will be seen that the input diodes 12 are effectively zero biased. That is, the base potential supplied by source 16 is described as ground potential. The cathode of tunnel diode 24 is returned to ground potential and the base potential supplied by source 28 is defined as ground potential. The potential supplied by source 20 is defined as being a substantial positive potential. Therefore, the maximum potential difference obtainable across diode 12 is in the path between source 10 and source 16 via diode 12 and resistor 14. However, a maximum potential difference of +50 millivolts is obtainable. By reference to the graph shown in FIGURE 2, it will be seen that even the germanium diodes 12 are effectively open-circuited. Therefore, negligible current, at most, flows through the input diodes 12. Since negligible forward current flows through these diodes, substantially no charge, $Q_s$, is stored therein. Consequently, when the positive going clock signal is supplied by source 16 via resistor 14, there is no charge found in the input diodes to be swept out by a reverse current, whereby diodes 12 appear to be open-circuits. Therefore, all of the charge supplied by source 16 passes through coupling diode 18 and tunnel diode 24 is ground. That is, when the signal applied by source 16 exceeds the magnitude of about +750 millivolts with respect to ground, a forward-biased potential difference of about 700 millivolts exists across the diode 18. At this point, the diode 18 begins to conduct whereby current is applied to tunnel diode 24. The parameters of the circuit determine that the current applied to tunnel diode 24 will be on the order of 6 to 10 milliamperes. Since the tunnel diode 24 was initially biased at an operating point of approximately 15 milliamperes and has a peak current value of approximately 20 milliamperes, it will be seen that the tunnel diode will be switched to the high voltage operating state by the application of the clock signal.

The switching of the tunnel diode from a low voltage operating condition to the high voltage operating condition is sensed at the output terminal 30. That is, when the tunnel diode 24 switches from the low condition to the high condition, the potential at the anode thereof switches from about +50 to about +450 millivolts and remains at that level even after the signal supplied by source 16 has subsided. The net change in the potential at the anode of tunnel diode 24 is detected at the output terminal 30 relative to ground.

The application of a negative going signal by source 28 is utilized to reset the tunnel diode. Thus, a signal having a base magnitude of approximately ground potential and a peak magnitude of approximately —2 volts, with respect to ground, is applied by the source 28. This signal is supplied to the cathode of diode 26. If it is assumed that the diode 26 is a silicon diode similar to diode 18, a potential difference of approximately 700 millivolts must exist thereacross before significant conduction occurs. Thus, the reset signal must be at least large enough to produce the 700 millivolt potential difference across the diode. These suggested potential values are not meant to limit the circuit in any way. Nevertheless, since it is desirable to switch tunnel diode 24 to the low voltage operating condition, it is required that the potential thereacross be shofed below the valley voltage and the current therethrough be shifted below the valley current. Thus, the potential across the tunnel diode must be reduced to about 200 millivolts or less and the current therethrough must be reduced to approximately 2 milliamperes or less. It will be clear that the application of the negative going reset signal by source 28 will be sufficient to assure the shifting of both the current and voltage at tunnel diode 24 to the necessary level to reset the tunnel diode.

For the alternative operating conditions, assume that any one or more of the input sources 10 supplies a high level (+450 millivolts) signal to the associated input coupling diode 12. It will be seen by the consideration of the parameters of the circuit, that a potential difference of at least 300 millivolts exists across the input coupling diode. As shown in FIGURE 2, a potential difference of about 300 millivolts across the germanium diode not only is beyond the knee of break-point of the curve but is sufficiently large to assure a significant current flow through the coupling diode. A current path for the forward current through the input coupling diodes 12 is from source 10 to source 16 (now at ground potential) via diodes 12 and resistor 14. It will be clear that only a negligible amount of current (at most) will pass through the diode 18 since diode 18 is still effectively zero biased. That is, in view of the 300 millivolt potential drop across diode 12, the maximum potential applied to the anode of diode 18 will be on the order of +150 millivolts while the potential at the cathode thereof is on the order of +50 millivolts. The potential difference of approximately 100 millivolts across a silicon diode is an insignificant potential relative to the breaking down and conducting by the diode. However, the complete circuit path permits forward current flow through diode 12 whereby charge, $Q_s$, may be stored therein. With the application of the clock signal by source 16, a reverse potential is applied at the cathode of diode 12 via resistor 14. Diode 12 will become a short-circuit when reverse biased by the clock signal, and will remain as a short-circuit until the charge stored therein is swept out of the lattice network of the semiconductor. The cathode of diode 12 is, therefore, effectively clamped at +450 millivolts. That is, as the signal supplied by source 16 attempts to exceed the value of +450 millivolts, current is passed, in the reverse direction, through diode 12 to source 10. Since this current, in view of the parameters of the circuit, will exceed a valve of 20 milliamperes, it will be seen that the valve of $tI$ will provide a large magnitude Q even in a short time duration. Since, at the instant when the charge $Q_s$ in the diode 12 has been swept clear, the diode 12 becomes an effective open circuit (in an idealized situation), the potential at the anode of diode 18 will become substantially equal to the potential of the signal applied by source 16. Therefore, the charge Q contained in the clock pulse applied by source 16 must not exceed the charge $Q_s$ by a significant amount. If the clock signal supplied by source 16 is, in fact, extremely long relative to the time in which diode 12 is swept clean of stored charge, a spurious and undesirable signal will be passed, via diode 18, to tunnel diode 24. However, if the signal supplied by source 16 is within the limits specified, the charge represented by the signal will be dissipated in cleaning-up the charge stored in diodes 12. Moreover, since the cathode of diode 18 is at a potential of about +50 millivolts, the anode thereof must exceed a minimum of +750 millivolts in order to begin to conduct any signficant current. Since the cathode of diodes 12, and therefore, the anode of diode 18 are clamped to approximately +450 millivolts, it is clear that a forward-bias potential difference of only about 400 millivolts will appear across the silicon diode 18. Reference to FIGURE 2 will clearly show that the silicon diode 18 remains non-conductive with such a small potential difference thereacross.

Since the tunnel diode 24 is not switched to the high voltage operating condition because of the lack of additional switching current, the application of a reset signal by source 28 is not necessary at this time. However, is a synchronized system the reset signal is applied and merely drives the tunnel diode 24 down along V–I characteristic (possibly even into the negative regions) but when the reset pulse is removed, the tunnel diode returns to its operating point previously described; namely, the tunnel diode is biased at an operating point of about 15 milliamperes current and about +50 millivolts thereacross.

It is obvious, of course, that the circuit produces an output signal only in the absence of any input signals where an output signal and an input signal are described as being high level signals. On the contrary, the circuit does not produce an output signal when input signals are supplied. This type of operation is clearly NOR logic operation.

Figure 3:
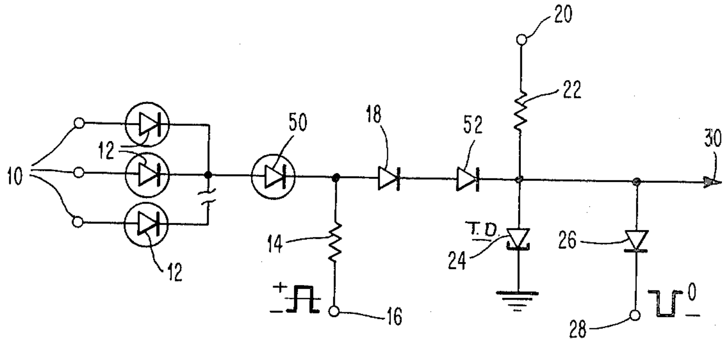
FIGURE 3 is a schematic diagram of a second embodiment of the invention.

Referring now to FIGURE 3, is shown another embodiment of the instant invention. This embodiment is basically similar to the invention shown in FIGURE 1. Therefore, similar components in FIGURES 1 and 3 bear similar reference numerals. However, the embodiment of FIGURE 3 has the added advantage that backward leakage current problems can be avoided. In addition, a level shifting diode is provided to assure proper operation. Since input coupling diodes 12 are germanium diodes which exhibit charge storing capabilities, there is a possibility of backward leakage current through the effective capacitance of the diodes even when reverse-biased. A large plurality of input coupling diodes permitting leakage current could conceivably effect a severe loss of signal current during the application of a clock signal by source 16. Therefore, the cathodes of the input coupling diode 12 are connected to the anode of a single coupling diode 50. Diode 50 is similar to diodes 12 inasmuch as it is a germanium type diode which exhibits charge storing characteristics. Therefore, the effective leakage capacitor seen by the circuit is substantially identical to the capacitance of diode 50. The cathode of diode is connected to current limited resistor 14 which is connected to clock source 16. However, inasmuch as the voltage drop which exists across the input coupling diodes 12 and 50 is now larger by the voltage drop which exists across the additional coupling diode 50, additional potential is provided by lowering the reference potential of the source 16. Thus, assume that the inherent forward voltage drop across the diode 50 at the proper operating condition is on the order of 300 millivolts. In order to balance the circuit requirements, the base potential for the signal supplied by source 16 is about −300 millivolts with respect to ground (rather than ground potential of source 16 in FIGURE 1). Again, the anode of the silicon coupling diode 18 is connected to the cathode of input coupling diode 50. The cathode of the silicon diode is connected to the anode of coupling diode 52. The cathode of diode 52 is connected to the anode of tunnel diode 24. Diode 52 is a further germanium diode having V–I characteristics similar to those of diode 50. However, in a preferred embodiment, diode 52 will exhibit high speed switching and little or no charge storing capabilities. A typical such diode will be an International ID5–050 type germanium diode. The additional diode 52 is inserted into the circuit to provide a voltage-drop element to balance the voltage drop which exists across diode 50. This additional voltage drop is necessary to provide a balanced condition such that silicon diode 18 is not improperly forward biased by the clock signal when applied, in the reverse direction, to the input diodes. The cathode of tunnel diode 24 is connected to a reference potential source, for example ground. The constant current source comprising source 20 and resistor 22 causes tunel diode 24 to operate in the bistable mode. Again, the reset network comprising diode 26 and source 28, as well as output terminal 30, is connected to the anode of tunnel diode 24.

Inasmuch as the circuits of FIGURES 1 and 3 are substantially similar, the operation is also similar. The operation of the circuit shown in FIGURE 3 differs only in that a slightly larger magnitude clock signal is applied to the circuit because of the larger voltage drop network. The clock signal will cause reverse current flow through the input coupling diodes 12 and 50 if, and only if, a high level input signal is presented previously in order to store charge in the diodes. Countrariwise, the clock signal will cause forward current flow through the coupling diodes 18 and 52 if a low level input signal is supplied to diode 50. Thus, an output signal is produced only in the absence of an input signal, and vice versa. This is NOR logic operation.

Figure 4:
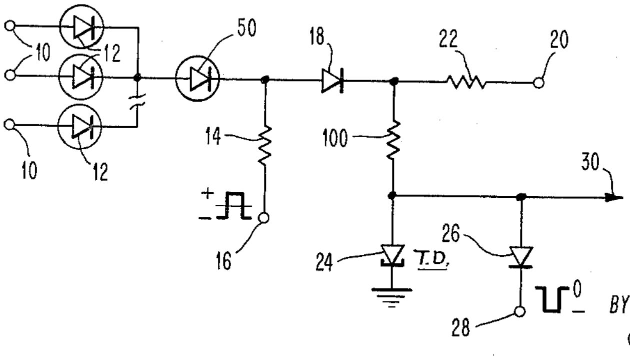
FIGURE 4 is a schematic diagram of a third embodiment of the invention.

Referring now to FIGURE 4, there is shown another embodiment of the instant invention. This embodiment is basically similar to the invention shown in FIGURES 1 and 3. Therefore, similar components in each of the figures bear similar reference numerals. The embodiment of FIGURE 4 includes the added advantage of FIGURE 3, namely, that the backward leakage current problems can be avoided. The modification incorporated in FIGURE 4 is that a level shifting impedance 100 is provided to assure proper operation. Thus, the germanium input coupling diodes 12 have the anodes thereof connected to input source 10. The cathodes of the coupling diodes 12 are connected to the anode of input coupling diode 50. The input coupling diodes are all the germanium, charge-storage type diodes. The cathode of input coupling diode 50 is connected to the anode of silicon coupling diode 18 and to one terminal of current limiting resistor 14. Another terminal of the resistor is connected to source 16 which is described relative to FIGURE 3 and has a negative base potential because of the larger potential drop requirements. The cathode of silicon coupling diode 18 is connected to the substantially constant current biasing source comprising source 20 and resistor 22. In addition, the cathode of diode 18 is connected to the anode of tunnel diode 24 via the level shifting impedance 100. This impedance is connected to the anode of tunnel diode 24, which has the cathode thereof connected to a reference potential source, as for example ground. Again the output terminal 30, as well as the reset network, comprising diode 26 and source 28, is connected to the anode of tunnel diode 24.

The operation of the circuit shown in FIGURE 4 is substantially similar to the operation of the circuits shown in FIGURES 1 and 3. The leakage current limiting input diode 50 is described relative to FIGURE 3. The modification of FIGURE 4 provides the insertion of level shifting impedance 100 between the coupling diode 18 and the tunnel diode 24. This impedance 100, which may be on the order of approximately 10 ohms, has the advantage that it provides a linear resistance whereby the level difference between the cathode of silicon diode 18 and the anode of tunnel diode 24 is a linear function of current. This level difference is provided in the form of a difference of potential which may be more readily defined in terms of the constant impedance 100. The potential difference across impedance 100 may be analogized to the potential difference which normally exists across the diode 52 shown in FIGURE 3. Thus, the impedance 100 serves to effectively balance the potential drop inherent across diode 50. Moreover, since the impedance 100 is connected in series between the tunnel diode and the constant current biasing source, a potential difference between the cathode of diode 18 and the anode of tunnel diode 24 is assured at all times when current is applied by the bias source. In addition, certain minimum potential drops across this impedance may be more accurately defined and are not dependent upon the operating characteristics of the component.

The operation of the circuit is substantially similar to the operation of the circuit shown in FIGURES 1 and 3. That is, the clock signal supplied by source 16 will cause a current flow. The current flow will be through the input coupling diodes 12 and 50 or through the coupling diode 18 in accordance with the presence or absence of an input signal, respectively. Moreover, the circuit produces an output signal only in the absence of an input signal and produces no output signal when an input signal is applied by any of the input sources 10. Therefore, it is obvious that the circuit performs the NOR logic operation.

There have been presented three embodiments of a NOR logic circuit. Each of these embodiments incorporates modifications of each of the other embodiments. The modifications incorporated in each of the embodiments provide certain advantageous operation, which is desirable. It is contemplated that certain other modifications may be incorporated into the circuit especially in the nature of the component values and the circuit parameters. However, any modification of this circuit which falls within the principles of the circuit and its operation as described, is meant to be included within the scope of this invention.

The embodiments of the invention in which an exclusive property or privilege is claimed are defined as follows:

1. In combination, input signal supplying means capable of supplying an input signal having two distinct levels, pulse supplying means for providing periodic pulses selectively bi-laterally conductive means connected between said input supplying means and said pulse supplying means, said selectively bi-laterally conductive means characterized by charge, storage capabilities when a forward current exists therein, said selectively bilaterally conductive means passing reverse current therethrough to said input means in response to a pulse from said pulse supplying means only when charge is stored in said selectively bilaterally conductive means, a bistable switching device characterized by amplification capabilities, bias means connected to said bistable device to normally bias said device in one of the stable operating states thereof, coupling means connected to said pulse supplying means and to said bistable device, said coupling means exhibiting no charge storage capabilities and being characterized by unilateral conductive capabilities to conduct current therethrough from said pulse supplying means to said bistable device only in the absence of reverse current in said selectively bilaterally conductive means, said bistable device adapted to change the stable operating state in response to conduction by said coupling means, output means connected to said bistable device, and reset means connected to said bistable device, and reset means connected to said bistable device to reurn said bistable device to said one stable operating state.

2. In combination, input signal supplying means capable of supplying an input signal having two potential levels, pulse supplying means for providing periodic pulses, charge storage diodes connected between said input supplying means and said pulse supplying means, said charge storage diodes adapted to pass forward current in response to one input signal level and the absence of a pulse applied thereto by said pulse supplying means, said charge storage diodes characterized by charge storage capabilities only when a forward current exists therein, said charge storage diodes adapted to pass reverse current in response to a different input signal level and the presence of a pulse applied thereto subsequent to the storage of charge therein, a bistable switching device normally operating in one of the stable operating states thereof, rectifier coupling means connected between said pulse supplying means and said bistable device, said coupling means characterized by conductive capabilities from said pulse supplying means to said bistable device and only in the absence of reverse current in said unilaterally conductive means, said bistable device adapted to change the stable operating state in response to conduction by said coupling means, and output means connected to said bistable device.

3. In combination, input signal supplying means capable of supplying an input signal having two distinct levels, pulse supplying means for providing periodic pulses, a plurality of substantially unilaterally conductive means connected between said input supplying means and said pulse supplying means, all of said unilaterally conductive means characterized by charge storage capabilities when a forward current exists therein, said substantially unilaterally conducting means selectively exhibiting reverse current therethrough only when charge is stored therein, a tunnel diode, bias means connected to said tunnel diode to normally bias said diode in one of the stable operating states thereof, rectifier coupling means connected to said pulse supplying means, first potential dropping means connected to said pulse supplying means and to said tunnel diode, second potential dropping means connected between said pulse supplying means and said unilaterally conducting means, said coupling means characterized by conductive capabilities only in the absence of charge storage in said unilaterally conductive means, said tunnel diode adapted to change the stable operating state in response to conduction by said coupling means, output means connected to said tunnel diode, and reset means connected to said tunnel diode to return said tunnel diode to said one stable operating state.

4. The combination recited in claim 3 wherein said first potential dropping means comprises a linear impedance which is connected to said pulse supplying means via said coupling means.

5. The combination recited in claim 3 wherein said second potential dropping means comprises a further unilateral conducting means characterized by charge storage capabilities and selectively permitting reverse current therethrough only when charge is stored therein.

References Cited by the Examiner

UNITED STATES PATENTS

| | | | |
|---|---|---|---|
| 2,986,652 | 5/61 | Eachus | 307—88.5 |
| 3,106,644 | 10/63 | Retzinger | 307—88.5 |

ARTHUR GAUSS, *Primary Examiner.*

UNITED STATES PATENT OFFICE
CERTIFICATE OF CORRECTION

Patent No. 3,211,925 October 12, 1965

Woo F. Chow

It is hereby certified that error appears in the above numbered patent requiring correction and that the said Letters Patent should read as corrected below.

Column 2, line 4, for "dodes, wheren" read -- diodes, wherein --; column 4, line 11, for "is" read -- to --; line 50, for "shofted" read -- shifted --; line 67, for "knee of" read -- knee or --; column 5, line 53, for "is a" read -- in a --; column 6, line 15, for "diode is connected to current limited" read -- diode 50 is connected to current limiting --; line 47, for "tunel" read -- tunnel --; column 8, line 26, for "reurn" read -- return --.

Signed and sealed this 19th day of July 1966.

EAL)

test:

ɪNEST W. SWIDER testing Officer

EDWARD J. BRENNER

Commissioner of Patents